United States Patent
Gagnaux

[15] 3,678,050
[45] July 18, 1972

[54] PREPARATION OF O,O-DIMETHYL-THIONOPHOSPHORIC ACID [O-QUINOXALYL-(2)] ESTER

[72] Inventor: Pierre Gagnaux, Bottmingen, Switzerland

[73] Assignee: Sandoz Ltd., (also known as Sandoz AG), Basel, Switzerland

[22] Filed: Jan. 20, 1970

[21] Appl. No.: 4,423

[30] Foreign Application Priority Data

Jan. 28, 1969 Switzerland ..........................1250/69

[52] U.S. Cl. .......................................................260/250 R
[51] Int. Cl. .......................................................C07d 51/78
[58] Field of Search ..............................................260/250 R

[56] References Cited

FOREIGN PATENTS OR APPLICATIONS 1,081,249  8/1967  Great Britain ......................260/250 R
1,085,340  9/1967  Great Britain ......................260/250 R

*Primary Examiner*—Nicholas S. Rizzo
*Attorney*—Gerald D. Sharkin, Robert S. Honor, Frederick H. Weinfeldt, Richard E. Vila and Walter F. Jewell

[57] ABSTRACT

The invention concerns a novel process for the production of O,O-dimethyl-thionophosphoric acid [O-quinoxalyl-(2)] ester of the formula:

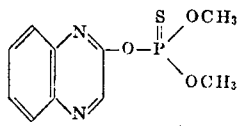

The compound is an insecticide and acaricide.

3 Claims, No Drawings

PREPARATION OF O,O-DIMETHYL-THIONOPHOSPHORIC ACID [O-QUINOXALYL-(2)] ESTER

The present invention relates to a process for the production of 0,0-dimethyl-thionophosphoric acid [O-quinoxalyl-(2)] ester of formula I.

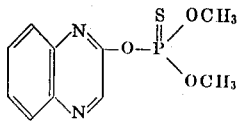

According to the invention, there is provided a process for the production of 0,0-dimethyl-thionophosphoric acid [O-quinoxalyl-(2)] ester, which comprises reacting a compound of formula II,

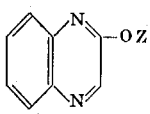

in which Z signifies sodium or potassium, with 0,0-dimethyl-thionophosphoric acid halide of formula III,

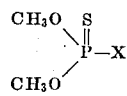

in which X signifies a halogen atom, in the presence of from 0.01 mol to 0.8 mols calculated on the amount of 2-hydroxy-quinoxaline, of a tertiary heterocyclic or tertiary aromatic amine catalyst, in an inert polar solvent.

The cation Z is preferably sodium and the halogen atom X is preferably chlorine.

Polar solvents especially suitable for the process of the invention are acetone and acetonitrile.

Heterocyclic tertiary amines, e.g. pyridine, or aromatic tertiary amines may be used as catalysts. A good yield is obtained with the addition of about 0.01 mol of the catalyst, calculated on the amount of 2-hydroxy-quinoxaline. In general when a larger amount of catalyst is added smaller yields of the desired product are obtained.

The reaction temperature may vary considerably. A temperature between −20° and the boiling point of the mixture, preferably between −20 and +50° C.

The 0,0-dimethyl-thionophosphoric acid [O-quinoxalyl-(2)] ester obtained in accordance with the process of the invention is a crystalline compound having a sharp melting point, which may be purified by recrystallization from the usual solvents.

The 0,0-dimethyl-thionophosphoric acid [O-quinoxalyl-(2)] ester obtained in accordance with the process of the invention is a useful insecticide and acaricide and is of low toxicity in warm-blooded animals.

The compound of formula I may be used as such in agriculture, in buildings, e.g. inhabited rooms, cellars, attics, stables, etc., and in protecting plants and also animals against insects and acarids.

The compound of formula I may be applied to its use on its own or in admixture with a suitable diluent, carrier or adjuvant. The compound may be applied to the required locus, e.g. a field of growing plants or an orchard, using conventional applicator equipment. Accordingly, formulations containing the compound of formula I and comprising spraying agents, dusting agents, wettable powders or emulsifiable concentrates may be prepared. A formulation conveniently contains about 0.01 to about 2 percent by weight of the compound of formula I together with one or more conventional wetting, emulsifying or dispersing agents.

The following Examples are illustrative of the invention, but in no way limit the scope thereof.

EXAMPLE 1:

219 g (1.5 mols) of 1,2-dihydro-2-oxoquinoxaline are boiled under reflux (with a water separator) together with 60 g (1.5 mols) of sodium hydroxide powder in 2000 cc of xylene while stirring, until complete dehydration has taken place. Cooling to room temperature is effected, the sodium salt is filtered off with suction, is washed with benzene and dried in a vacuum at 70°.

48 g of 0,0-dimethyl-thionophosphoryl chloride are added dropwise at room temperature while stirring during the course of 30 minutes to a mixture of 51 g of the sodium salt of 1,2-dihydro-2-oxo-quinoxaline with 300 cc of acetonitrile and 1.5 cc of pyridine. The reaction mixture is further stirred for 3½ hours, is cooled to 0° and filtered with suction. The filtrate is subsequently concentrated in a vacuum in a water bath at 50° and the oily residue poured on ice water. After a few minutes the precipitated, solid product is filtered off by suction and dissolved in 120 cc of acetone while moist. The solution is stirred for a short time with 12 g of active charcoal, is subsequently filtered and the filtrate is poured into a mixture of 500 cc of ice water and 60 cc of a 10 percent caustic soda solution while stirring. After stirring for 20 minutes, the solid product is filtered off by suction, is again washed with water and dissolved in 280 cc of benzene. A small aqueous layer is separated and the benzene solution is evaporated to dryness in a water jet vacuum on a water bath (50°). The evaporation residue becomes solid after standing at room temperature for several hours. 61.5 g = 75 percent of the theoretic yield of 0,0-dimethyl-thionophosphoric acid [O-quinoxalyl-(2)] ester having a melting point of 45°–47° are obtained.

Analysis: $C_{10}H_{11}N_2O_3PS$

Molecular weight: 270.25

C found 44.5%    N found 10.4%    P found 11.5%
calculated 44.8%    calculated 9.8%    calculated 11.7%

What is claimed is:

1. A process for the production of 0,0-dimethyl-thionophosphoric acid [O-qunioxalyl-(2)] ester of the formula:

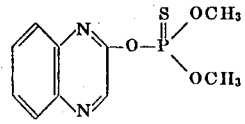

which comprises reacting an alkali metal salt of 2-hydroxy-quinoxaline of the formula:

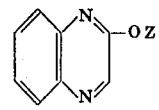

wherein Z is sodium or potassium, with 0,0-dimethyl-thionophosphoric acid halide of the formula:

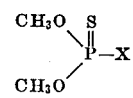

wherein X is a halogen atom, in the presence of from 0.01 mol to 0.8 mols, calculated on the amount of said alkali metal salt of 2-hydroxy-quinoxaline, of pyridine, in an inert polar solvent.

2. A process according to claim 1, wherein Z signifies sodium and X signifies chlorine.

3. A process according to claim 1, wherein the inert polar solvent is acetone or acetonitrile.

* * * * *